US009736916B2

(12) United States Patent
Hollberg

(10) Patent No.: US 9,736,916 B2
(45) Date of Patent: Aug. 15, 2017

(54) PLASMA ELECTRODE FOR A PLASMA ARC TORCH WITH REPLACEABLE ELECTRODE TIP

(71) Applicant: Manfred Hollberg, Goldach (CH)

(72) Inventor: Manfred Hollberg, Goldach (CH)

( * ) Notice: Subject to any disclaimer, the term of this patent is extended or adjusted under 35 U.S.C. 154(b) by 284 days.

(21) Appl. No.: 14/361,903

(22) PCT Filed: Mar. 22, 2013

(86) PCT No.: PCT/EP2013/000876
§ 371 (c)(1),
(2) Date: May 30, 2014

(87) PCT Pub. No.: WO2013/139484
PCT Pub. Date: Sep. 26, 2013

(65) Prior Publication Data

US 2014/0291303 A1 Oct. 2, 2014

(30) Foreign Application Priority Data

Mar. 23, 2012 (EP) .................................. 12 002 077

(51) Int. Cl.
*B23K 10/00* (2006.01)
*H05H 1/34* (2006.01)
*H05H 1/28* (2006.01)

(52) U.S. Cl.
CPC ................ *H05H 1/34* (2013.01); *H05H 1/28* (2013.01); *H05H 2001/3436* (2013.01); *H05H 2001/3442* (2013.01)

(58) Field of Classification Search
CPC .... H05H 1/34; H05H 1/28; H05H 2001/3436; H05H 2001/3442
USPC ......... 219/121.48, 121.52, 121.49, 121.5, 75
See application file for complete search history.

(56) References Cited

U.S. PATENT DOCUMENTS

| | | | | | |
|---|---|---|---|---|---|
| 5,216,221 | A * | 6/1993 | Carkhuff | H05H 1/36 219/121.48 |
| 5,440,094 | A * | 8/1995 | Zapletal | H05H 1/34 219/121.48 |
| 6,114,650 | A | 9/2000 | Marner et al. | |
| 6,498,316 | B1 * | 12/2002 | Aher | B23K 10/00 219/121.39 |
| 2006/0049150 | A1 | 3/2006 | Severance, Jr. | |
| 2011/0240609 | A1 | 10/2011 | Jehnert et al. | |
| 2013/0193118 | A1 * | 8/2013 | Severance, Jr. | B23K 10/00 219/121.5 |

(Continued)

FOREIGN PATENT DOCUMENTS

| | | | |
|---|---|---|---|
| DE | 69937323 | T2 | 7/2008 |
| EP | 1633172 | A2 | 3/2006 |
| EP | 1765046 | B1 | 8/2010 |

(Continued)

*Primary Examiner* — Mark Paschall
(74) *Attorney, Agent, or Firm* — Browdy and Neimark, PLLC

(57) ABSTRACT

Plasma electrode (1) for a plasma arc torch consisting of an electrode body, at least one electrode core (4) disposed on the electrode tip, wherein the plasma electrode (1) is constructed in at least two parts and consists of the electrode tip (2) and an electrode part (3), and out of the electrode tip (2) and a electrode part (3) consists, and that the electrode tip (2) is held replaceably on the electrode part (3).

10 Claims, 8 Drawing Sheets

(56) References Cited

U.S. PATENT DOCUMENTS

Figure 2:
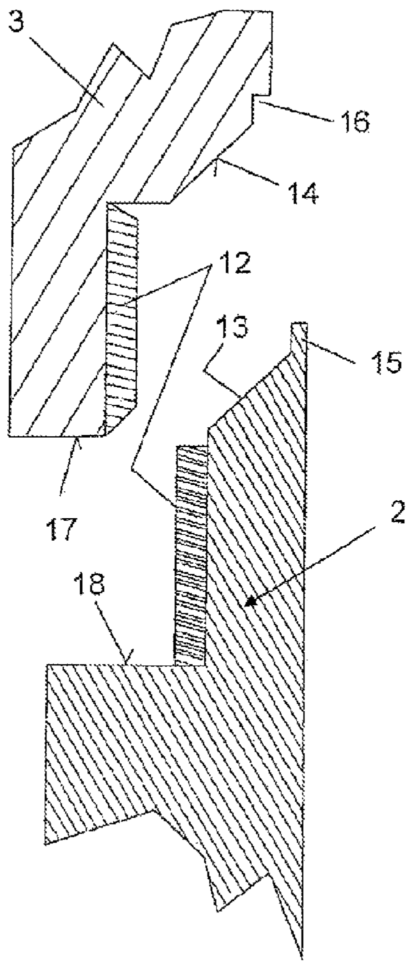

| | | | | |
|---|---|---|---|---|
| 2015/0041444 | A1* | 2/2015 | Darrow | B23K 35/0216<br>219/121.52 |
| 2015/0083695 | A1* | 3/2015 | Laurisch | H05H 1/34<br>219/121.49 |

FOREIGN PATENT DOCUMENTS

| | | | |
|---|---|---|---|
| EP | 2408274 | A2 | 1/2012 |
| JP | 2007-180028 | A | 7/2007 |

* cited by examiner

PLASMA ELECTRODE FOR A PLASMA ARC TORCH WITH REPLACEABLE ELECTRODE TIP

The invention relates to a plasma electrode for a plasma arc torch, consisting of an electrode body which has at least one electrode core disposed on the electrode tip.

Such plasma electrodes for use in plasma arc torches have become known in diverse embodiments.

As an example reference is made to EP 2 408 274 A2, JP 2007-180028 A or EP 1 765 046 B1 or DE000069937323T2.

With regard to the functioning and the construction of a plasma arc torch reference is made to the last-mentioned documents according to EP 1 765 046 B1 or DE000069937323T2, the content of the disclosure of which is to be incorporated completely into the content of the disclosure of the present invention.

The wear on the plasma electrode during operation is considerable. The electrode core inserted into the front face of the plasma electrode in the region of the electrode tip in a bore generates a plasma arc at temperatures in the range between 1000 and 2000° C. and is made of an electrically conductive highly emissive material, for example hafnium or zirconium. The electrode tip is severely stressed by the high burning temperatures. Furthermore, material erosions are produced on the electrode core which are deposited as material splashes on the electrode tip and the surroundings thereof, which leads to unwanted wear and a limitation of the service life.

EP 1 633 172 A2 proposes that the electrode core which is made of a hafnium material is held in an insert part made of silver on the electrode tip. This insert part (see FIG. 7) is soldered into the front region of the electrode tip.

It is therefore not possible to replace the electrode tip as a separate part. On the contrary, in the event of wear the entire electrode must be replaced, which is associated with high costs.

The object of the invention therefore is to modify a plasma electrode for a plasma arc torch of the type referred to above so that an easier and more cost-effective replacement of the electrode is possible in the event of wear.

In order to achieve this object the invention is characterised by the technical teaching of claim 1.

The starting point for the invention is that the electrode made of a high-grade material (for example Ag) is constructed in at least two parts and only the front replaceable tip part is made of a high-grade material (such as for example Ag), whereas the rear electrode part can be made of a less high-grade material, such as for example Cu or a Cu alloy or a comparable material.

It has been ascertained that only the tip region of the electrode with the hafnium or zirconium core inserted there is subject to substantial wear and in precisely this part—located directly on the tip—burn-out tracks are produced which in the prior art necessitate a replacement of the entire electrode.

The division of the electrode into two parts according to the invention is sensible above all in the case of electrodes with an overall length of more than 10-12 mm. In such a case the division into two parts takes place in such a way that the replaceable tip has a length of for example 6 mm, whereas the remaining rear electrode part makes up the rest of the length.

However, a division into two parts takes place particularly in the case of relatively long electrodes with an overall length of for example 40 mm or more. In this case it is reasonable to construct the replaceable tip with a length of 10 mm, whereas the rest of the length of the electrode part can be made of a non-precious material. Accordingly it is a feature of the invention that the plasma electrode is constructed at least in two parts and consists at least of the front electrode tip and a rear electrode part and that the electrode tip is held replaceably on the electrode part.

Thus the invention provides a multi-part plasma electrode, wherein in order to simplify the description only two parts of this plasma electrode are assumed in the description, although the plasma electrode can also consist of more than two parts. Therefore the description of a two-part plasma electrode should not limit the scope of protection of the invention.

It is an essential feature of the invention that in the case of a two-part construction of the plasma electrode it is possible to release the front part from the rear part because these two parts are preferably releasably connected to one another.

In this way the front electrode tip can be removed with the electrode core introduced there from the rear electrode part of the plasma electrode if wear occurs on the electrode tip.

Thus a quick replacement of the electrode tip is possible, without the entire plasma electrode having to be replaced.

In a preferred embodiment of the invention the releasable connection between the two parts of the plasma electrode is constructed as a screw connection, as a plug-type connection or as a combined screw/plug-type connection.

In the simplest case the screw connection consists of two interengaging threads. An internal thread which can be screwed into an associated external thread in the region of the rear electrode part of the plasma electrode can be disposed on the electrode tip.

In another embodiment it may also be provided that the electrode tip has an external thread which can be screwed onto an associated internal thread of the rear electrode part of the plasma electrode.

In a third embodiment it may be provided that instead of the screw connection a plug-type connection is used, such as for example a bayonet plug-type connection, which can be released and fastened by a turning and plugging movement.

In another embodiment it is provided that the releasable connection between the two parts of the plasma electrode consists of a sealed flange connection, wherein two opposing flanges on the two parts which are associated with one another touch one another and are sealed with respect to one another in a liquid-tight manner. Such a flange connection is secured by a union nut in conjunction with a thread on the opposing part.

In addition to said plug-type or screw connections or flange connections or combinations of plug-type/screw connections with flange connections, clamp connections are also provided. Such a clamp connection is for example a flange connection, with two flanges opposed in a sealing manner and resting on one another which are held in a sealing manner at a reciprocal contact pressure by an eccentric clamp ring.

In all said connections it is important that, when a water-cooled plasma electrode is involved, then said releasable connection between the at least two parts of the plasma electrode is also constructed in a liquid-tight manner.

The given technical teaching produces the advantage that also high-grade materials can be used without damage to the materials, as all the material combinations between the material of the electrode tip and the material of the rear electrode part of the plasma electrode are possible.

Thus it may be provided that the rear electrode part of the plasma electrode is made of a cost-effective copper material or a copper alloy, whereas the front part of the electrode tip which is subject to wear is made of a silver material or a silver alloy.

Because only a relatively short region of the plasma electrode has to be replaced, namely only the short electrode tip, this results in the use of expensive materials in particular with no damage to the materials when for example the electrode tip is made of the high-grade silver or a silver alloy.

With regard to the material combinations between the material of the electrode part and the electrode tip the following combinations are possible, wherein the first material given is always the material of the electrode part and the second material given is the material of the electrode tip:

Cu—Cu
Cu—Ag
Ag—Cu
Ag—Ag

The use of silver as a highly conductive material has only been specified by way of example. Of course, other highly conductive, easily workable materials which have the characteristics of silver can also be used. In particular tin alloys or copper-tin alloys (bronze) may be considered here.

The aforementioned materials can be used in the same aforementioned material combinations as have been specified above with the example of the material Ag.

The invention is not limited to hollow cylindrical plasma electrodes, in the internal space of which a cooling tube is disposed by which a cooling medium—preferably water—is introduced into the interior of the plasma electrode at the front end, is redirected in the vicinity of the electrode tip, and then is led out of the plasma electrode again. The function of such a water-cooled plasma electrode is apparent from one of the aforementioned documents.

The invention also claims uncooled hollow cylindrical or also plasma electrodes made of solid material which are at least in two parts and the front part which is subject to wear is connected to the rear part so as to be easily releasable.

The subject matter of the present invention is apparent not only from the subject matter of the individual claims, but also from the combination of the individual claims with one another.

All the details and features disclosed in the documents, including the abstract, in particular the spatial configuration illustrated in the drawings, are claimed as essential to the invention in so far as they are individually or in combination novel over the prior art.

The invention is explained in greater detail below with reference to drawings which show several embodiments. In this case the drawings and the description thereof illustrate further features and advantages which are essential to the invention.

Figure 1:
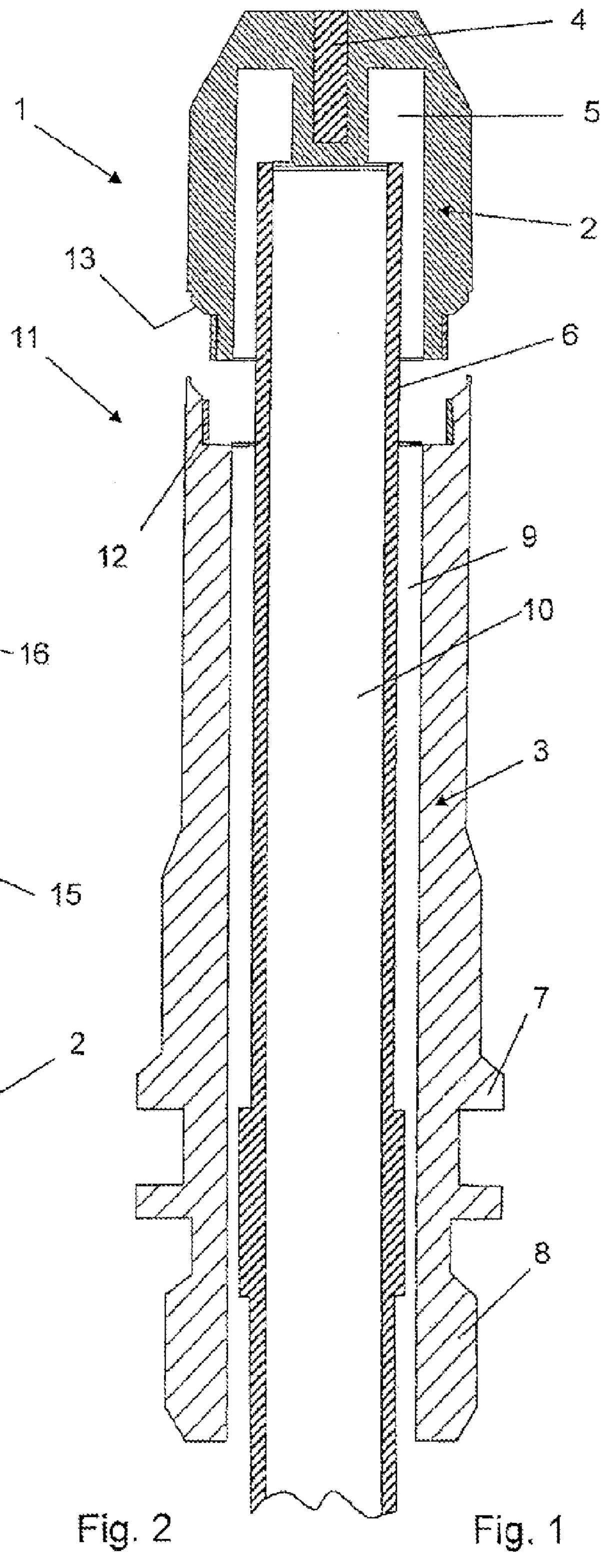
Figure 4:
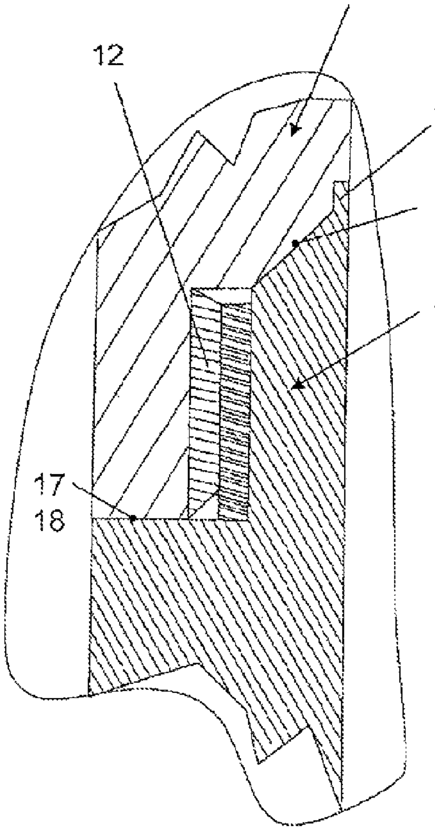
Figure 3:
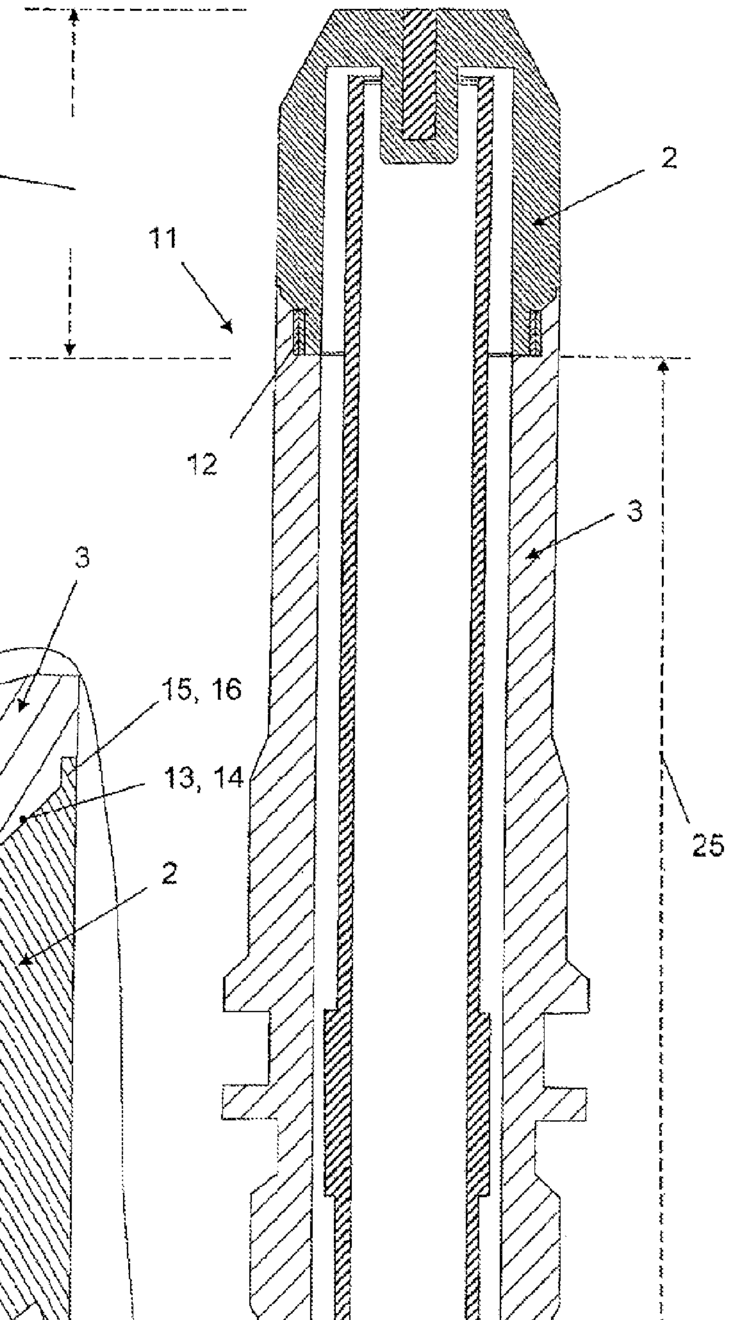
Figure 6:
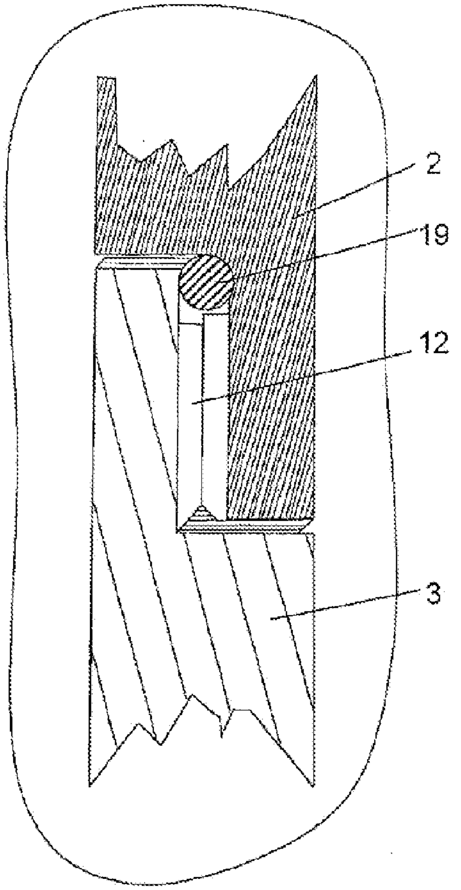
Figure 5:
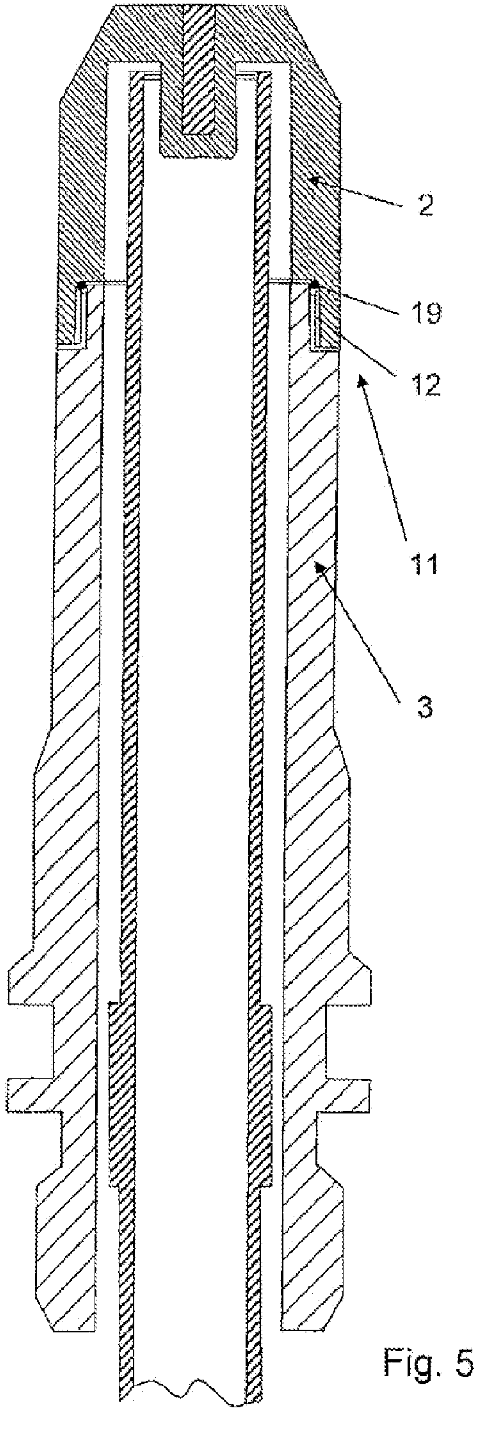
Figure 7:
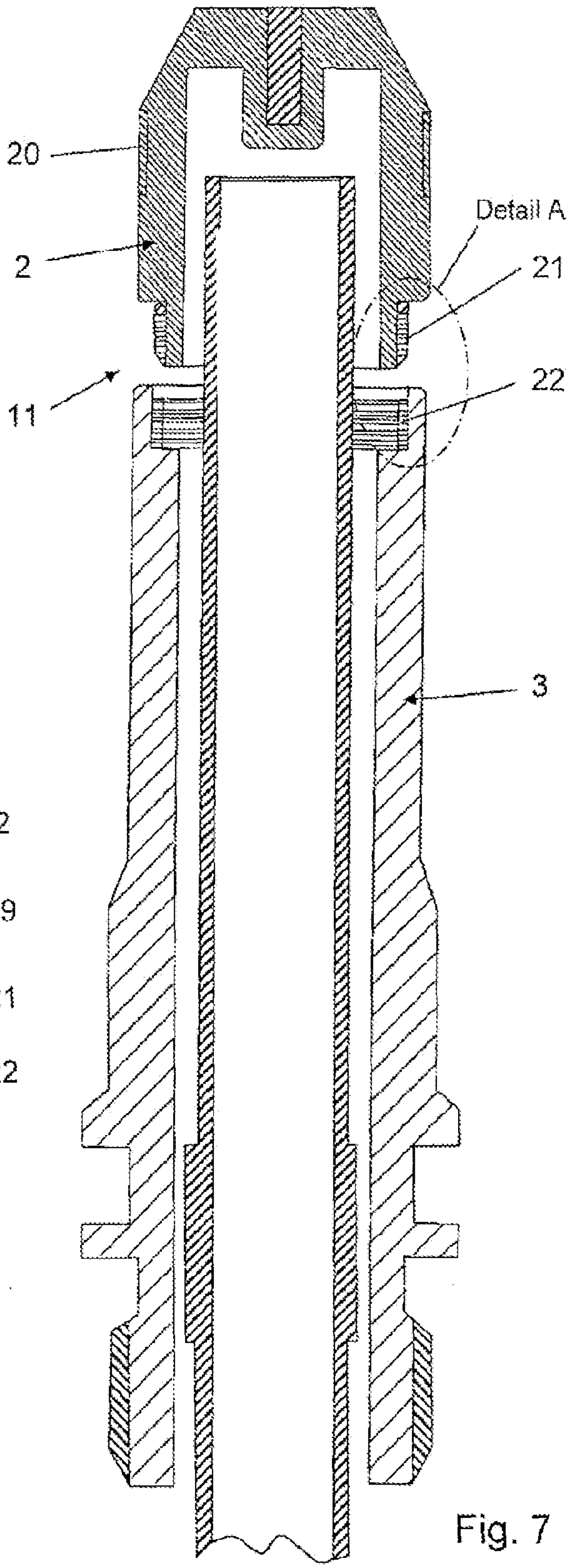
Figure 8:
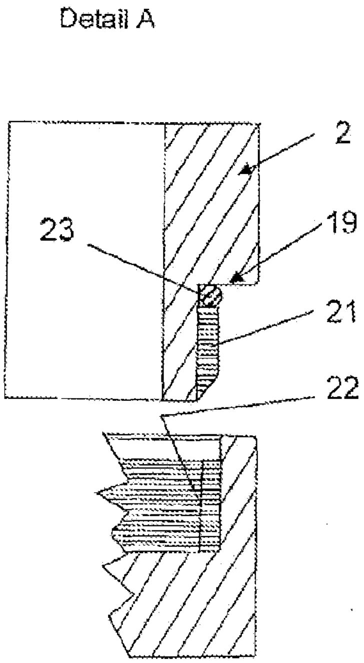
Figure 10:
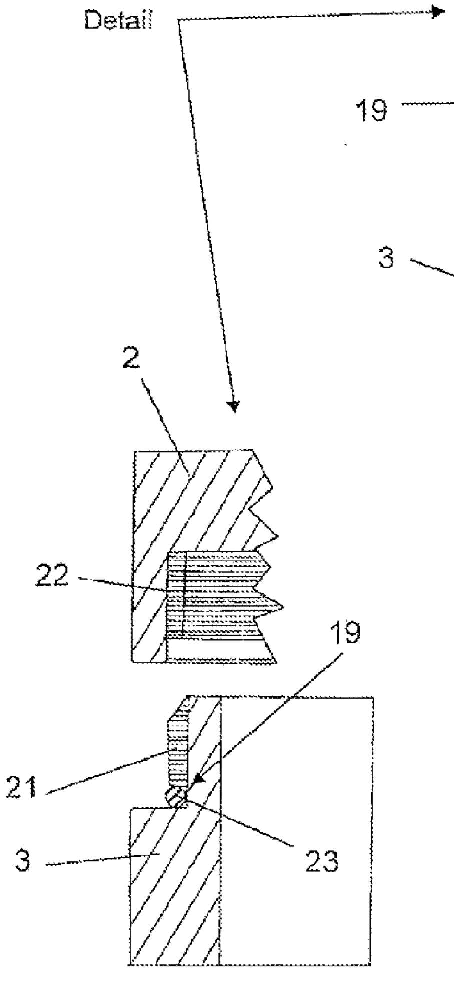
Figure 9:
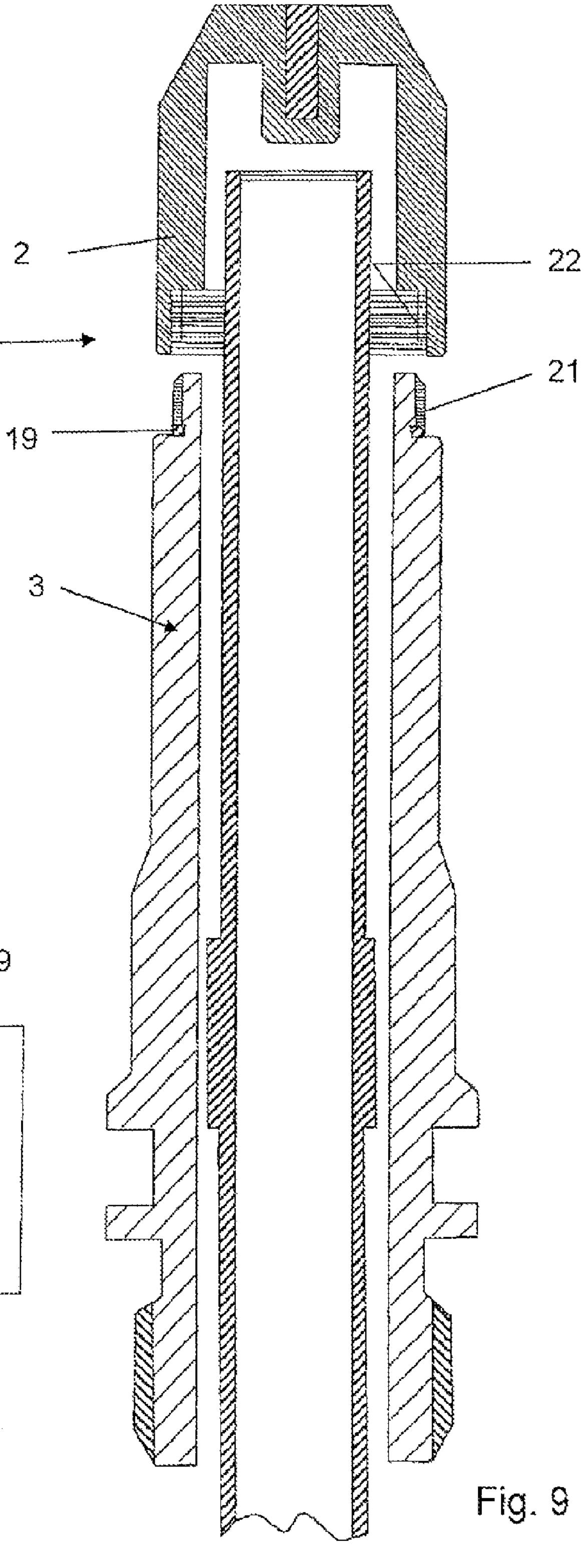
Figure 12:
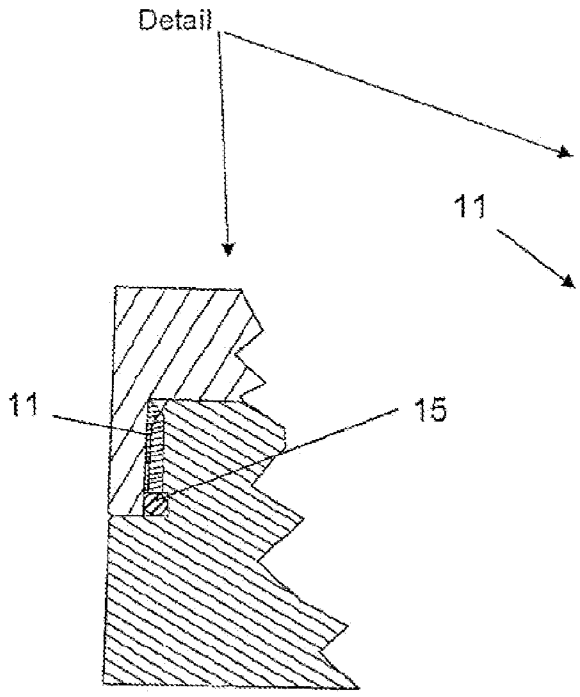
Figure 11:
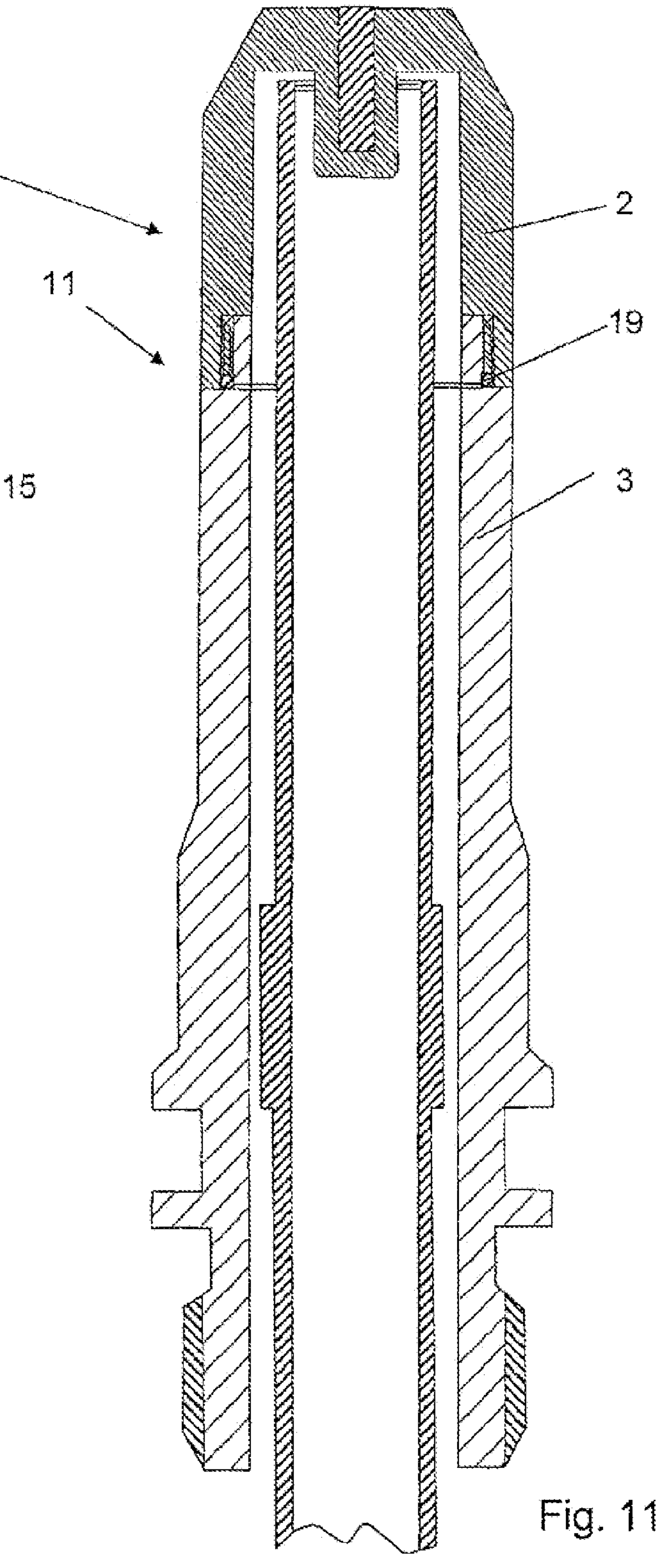
Figure 13:
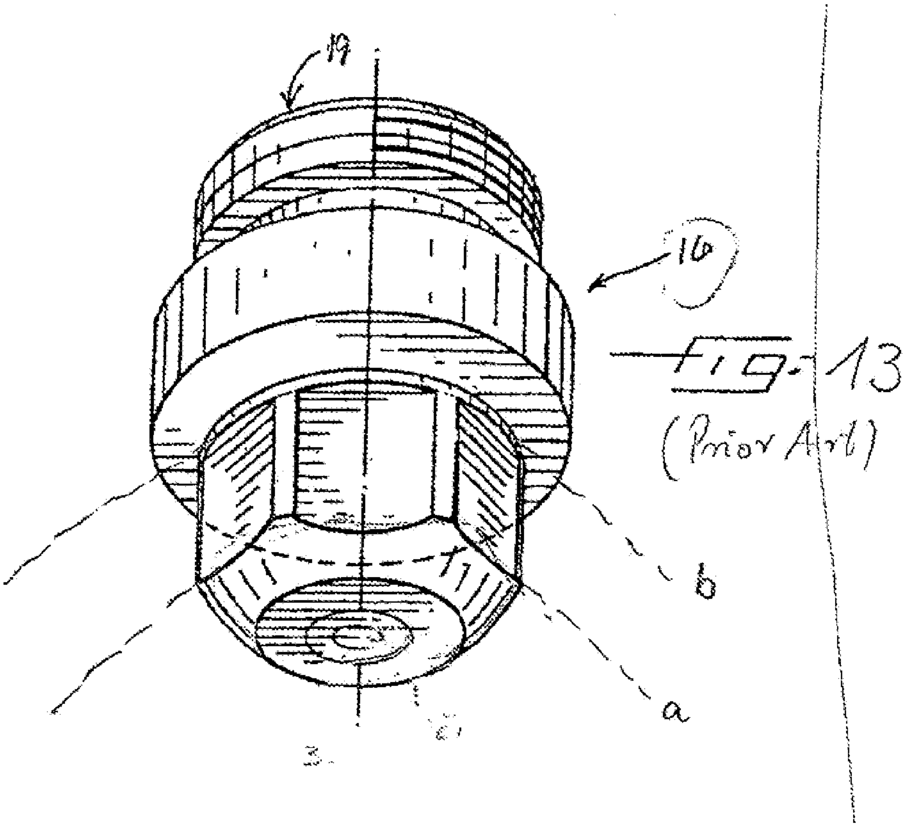
Fig. 13 (Prior Art)
Figure 14:
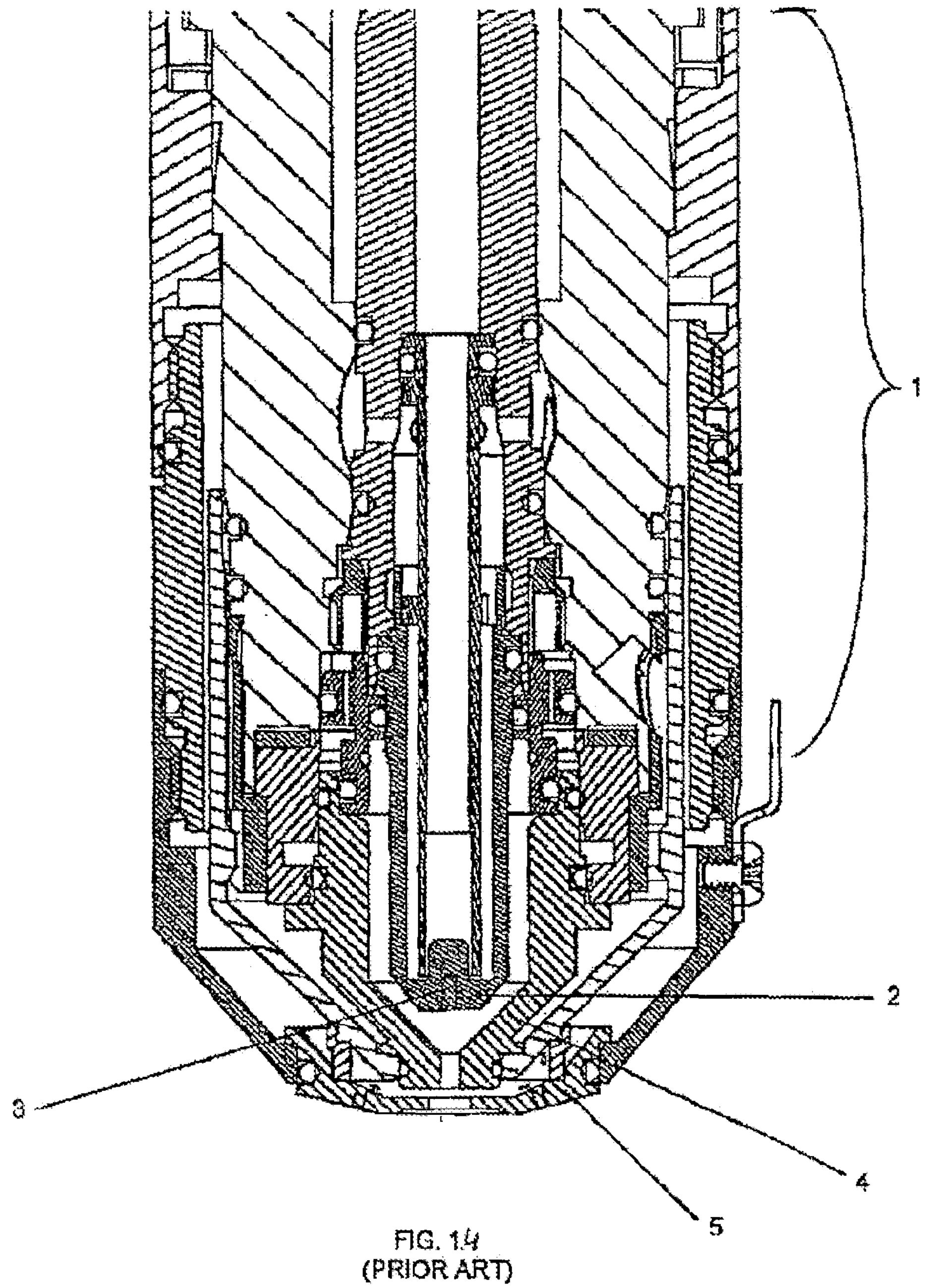
FIG. 14 (PRIOR ART)

In the drawings:

FIG. 1 shows a section through a first embodiment of a two-part plasma electrode in the disassembled state, FIG. 2 shows a detail section through the screw connection according to FIG. 1, FIG. 3 shows a section through the plasma electrode according to FIG. 1 in the assembled state, FIG. 4 shows the screw connection according to FIG. 2 in the assembled state, FIG. 5 shows a section through a second embodiment of a two-part plasma electrode, FIG. 6 shows a section through the sealed screw connection, FIG. 7 shows the plasma electrode according to FIG. 5 in the disassembled state, FIG. 8 shows a detail of the threaded screw connection according to FIG. 7, FIG. 9 shows a third preferred embodiment of a plasma electrode in the disassembled state, FIG. 10 shows a detail of the threaded screw connection according to FIG. 9 in the disassembled state, FIG. 11 shows the plasma electrode according to FIG. 9 in the assembled state, FIG. 12 shows the threaded screw connection according to FIG. 10 in the screwed-in state, FIG. 13 shows a plasma arc torch according to the prior art according to DE000069937323T2, FIG. 14 shows a plasma arc torch according to the prior art according to EP 1 765 046 B1.

The plasma electrode 1 shown in FIG. 1 is made up of two parts and consists of the front replaceable electrode tip 2 and a rear electrode part 3 which is centred by a radially outer fastening flange 7 on the inner face of a fastening body (electrode holder) not shown in greater detail and moreover can be screwed with a thread 8 into such a fastening body.

Instead of a screw fastening by means of the thread 8 the entire plasma electrode 1 can also be inserted and sealed in a fastening body not shown in greater detail. A cooling tube 6 which engages with its front end in a receiving space 5 in the region of the electrode tip 2 is disposed centrally in the interior 10 of the plasma electrode 1.

An electrode core 4 made of a highly emissive material such as for example a hafnium or zirconium material is introduced into a bore in the electrode tip 2.

The cooling of the plasma electrode takes place in such a way that a stream of cooling medium is introduced into the interior 10 of the cooling tube 6, is redirected in the region of the receiving space 5 in the electrode tip 2 and is then returned again by means of the radially outer internal bore 9.

It is important that the two parts (electrode tip 2 and electrode part 3) are releasably connected to one another. In the embodiment shown in FIG. 2 the connection region 11 of the releasable connection consists of a screw thread. In this case the electrode tip 2 has on a vertical flange an external thread which engages in an associated internal thread on a flange likewise formed on the electrode part 3. In this way a screw thread 12 is formed.

For automatic centring of this screw thread it is provided that conical surfaces 13, 14 which are opposite to and aligned with one another are disposed on associated flanges of the electrode tip 2 and of the electrode part 3 and that furthermore a preferably circumferential annular flange 15 on the electrode part 3 engages in an associated annular groove 16 and is centred there.

Automatic centring of the screw connection takes place by the engagement of the annular flange 15 and the annular groove 16 in conjunction with the obliquely directed conical surfaces 13, 14.

In addition, in the case of complete stabilisation of the screw connection (see FIG. 4) the horizontal projections 17, 18 rest in a sealing manner on one another. Additional sealing means such as for example a sealing ring 19 can be disposed in this region.

FIG. 3 shows the assembled structure of the plasma electrode shown in the disassembled state in FIG. 1, where it can be seen that the front replaceable electrode tip 2 has a relatively short length 24 which is shorter by a multiple than, by comparison, the non-replaceable electrode part 3 with a substantially greater length 25.

The ratios of these two lengths 24, 25 may vary in the range between 1:1 and 1:6.

In all embodiments it is important that the electrode tip 2 is fastened so as to be easily releasable on the electrode part 3 on the electrode side and is therefore easily replaceable if it is worn. It is kept short in order to keep the material consumption low during replacement.

FIGS. 5 to 8 show the kinematic reversal of a screw thread illustrated by 12 in FIGS. 1 to 4. It can be seen there that the screw thread 12 consists of an internal thread which is disposed on the inner face of the electrode tip 2 and which can be screwed into an associated radially outwardly directed external thread on the electrode part 3.

The threaded screw connection is sealed in a liquid-tight manner by a sealing ring 19.

A further sealing ring 19 can be disposed in the region of the projections 17, 18 facing one another.

FIGS. 7 and 8 show another embodiment of the screw connection, and moreover show that in the region of the electrode tip 2 a key surface 20 can be provided for the engagement of a suitable tool by which the electrode tip 2 can be unscrewed from the electrode part 3.

Here too an external thread which co-operates with an internal thread in the interior of the electrode part 3 is disposed on the rear face of the electrode tip 2, and the entire threaded screw connection is sealed in a liquid-tight manner by a sealing ring 19 which is inserted in an associated annular groove 23 on the vertical flange of the electrode tip 2.

Thus the external thread 21 on the electrode tip 2 co-operates with the internal thread 22 on the electrode part 3 as a screw thread 1.

FIGS. 9 to 12 show as a further embodiment a plasma electrode in which the sealing ring 19 is formed in the region of an outwardly open annular groove 23 on the foot of the vertical flange in the electrode part 3.

Here the electrode tip 2 has an internal thread 22 which with the associated external thread 21 produces the sealed screw connection in the region of the connecting part 11.

In FIGS. 11 and 12 the threaded screw connections shown in FIGS. 9 to 10 are shown in the screwed-in state.

FIG. 13 shows the prior art according to DE000069937323T2 and FIG. 2 of this document shows an electrode 16 which can be screwed into a holder, is constructed in one piece and in the event of wear must be replaced as an entire part. For this purpose the electrode 16 is screwed with an upper screw thread 19 into a holder.

By comparison with this prior art the invention consists of constructing the known electrode 16 in two parts, constructing the front tip as an easily replaceable electrode tip 2 and the rear part of the electrode 16 as an electrode part of the electrode body of the plasma electrode.

According to the invention the sub-division would take place at the level of the lowermost edge of the electrode 16 illustrated in FIG. 2 of this document. Thus the lower region of the electrode adjoining the hexagon is designed according to the invention to be replaceable and forms a replaceable electrode tip which is held releasably there. This is characterised by the broken line a. Another possibility resides in the separation of the two electrode parts according to the upper line b.

Thus in the event of wear of the electrode 16 the front tip region of the electrode (characterised by the lines a or b) which is located in the immediate vicinity of the core 29 must be replaced, and therefore the rear part of the plasma electrode 16 no longer has to be replaced.

FIG. 14 (prior art according to EP 1 765 046 B1) shows a replaceable one-part electrode 2 of considerable length, which corresponds in principle to the embodiment of the electrode according to the invention. The features which are identical are the upper screw-in thread and two annular grooves, in each of which an O ring is inlaid, in order to be able to screw the electrode into an electrode holder in a sealed manner.

The invention provides that the electrode shown in FIG. 14 is divided on the lowermost tip—approximately at the level of the reference numeral 3—and there forms the replaceable electrode tip. The electrode tip thus formed only has to be constructed with such a length that the fastening surfaces to be disposed there and the electrode core can be arranged.

KEY TO DRAWINGS

1 plasma electrode
2 electrode tip
3 electrode part
4 electrode core
5 receiving space
6 cooling tube
7 fastening flange
8 thread
9 internal bore
10 interior
11 connecting part
12 screw thread
13 conical surfaces
14 conical surfaces
15 annular flange
16 annular groove
17 projection
18 projection
19 sealing ring
20 key surface
21 external thread
22 internal thread
23 annular groove (for 19)
24 length (of 2)
25 length (of 3)

The invention claimed is:

1. A plasma electrode for a plasma arc torch, consisting of an electrode body, the electrode body comprising:
- an electrode tip comprising:
  - a front electrode tip having a first end having an electrode core arranged along a central longitudinal axis, and a second end having a connector, and
  - a separate rear electrode tip having a first end and a second end,
- a tubular electrode part comprising a fastening flange and a screw thread or plug-type connection disposed at the send of the rear electrode tip to removably connect the rear electrode tip to an electrode holder, and
- a connector arranged on the second end of the rear electrode tip and between the front electrode tip and the separate rear electrode tip to releasably connect to the connector of the second end of the front electrode tip.

2. The plasma electrode according to claim 1, wherein the connector on the second end of the rear electrode tip and the connector on the second end of the front electrode tip is a sealed screw connection or plug-type connection or screw/plug-type connection.

3. The plasma electrode according to claim 2, wherein the sealed screw connection or plug-type connection or screw/plug-type connection is self-centering.

4. The plasma electrode according to claim 1, wherein the ratio of lengths between the front replaceable electrode tip and the rear electrode tip is in the range between 1:6 and 1:1.

5. The plasma electrode according to claim 1, wherein the material of the front electrode tip and of the electrode tip is identical.

6. The plasma electrode according to claim 1, wherein the material of the front electrode tip and of the rear electrode tip is not identical.

7. The plasma electrode according to claim 1, wherein the plasma electrode is a hollow cylindrical metal body, wherein a cooling tube is disposed in an interior of the hollow cylindrical metal body.

8. The plasma electrode according to claim 1, wherein at least the front electrode tip is made of a solid material.

9. The plasma electrode according to claim 1, wherein the threaded connector on the second end of the rear electrode tip and the threaded connector on the second end of the front electrode tip is constructed as a sealed flange connection with a union nut for fastening and securing the flange connection.

10. A plasma electrode for a plasma arc torch, consisting of an electrode body, the electrode body comprising:

a front electrode tip having a first end configured to receive an electrode core, and a second end having a connector, and a rear electrode part having a first end and a second end, the first end of the rear electrode part comprising a fastening flange and a screw thread or plug-type connection configured to removably connect the rear electrode part to an electrode holder, the second end of the rear electrode part having a connector configured to releasably connect to the connector of the second end of the front electrode tip, wherein the threaded connector on the second end of the rear electrode part and the threaded connector on the second end of the front electrode tip is constructed as a sealed flange connection with a union nut for fastening and securing the flange connection.

* * * * *